United States Patent [19]
Yamaguchi et al.

[11] Patent Number: 5,171,958
[45] Date of Patent: Dec. 15, 1992

[54] HIGH-EFFICIENCY FILLET WELDING METHOD FOR STEEL PLATE

[75] Inventors: Tadamasa Yamaguchi, Chiba; Yoshimitsu Meguro; Saburo Hayashi, both of Tokyo; Matsushige Nakajima, Kagawa, all of Japan

[73] Assignee: Kawasaki Steel Corporation, Japan

[21] Appl. No.: 744,328

[22] Filed: Aug. 13, 1991

[30] Foreign Application Priority Data

Aug. 16, 1990 [JP] Japan .................................. 2-217371

[51] Int. Cl.$^5$ ............................................. B23K 9/18
[52] U.S. Cl. .................................. 219/73; 219/137 WM
[58] Field of Search ......................... 219/73, 137 WM

[56] References Cited
U.S. PATENT DOCUMENTS

| | | | |
|---|---|---|---|
| 3,171,944 | 3/1965 | Linnander | 219/73 |
| 4,214,141 | 7/1980 | Okuda et al. | 219/73 |
| 4,363,951 | 12/1982 | Shiga | 219/73 |
| 5,004,884 | 4/1991 | Sakaguchi et al. | 219/73 |

Primary Examiner—Clifford C. Shaw
Attorney, Agent, or Firm—Austin R. Miller

[57] ABSTRACT

A high-efficiency fillet welding method for conducting, without edge preparation, T-shape fillet welding of thick steel webs having a C content not more than 0.21 wt %. The welding is conducted by using a leading electrode (L) and a trailing electrode (T) composed of wires of about 4.8 to 6.4 mm diameter and containing C in an amount which meets the condition of formula (1), as well as 1.50 to 2.50 wt % of Mn. The welding is executed in such a manner that the ratio $I_T/I_L$ of the current $I_T$ supplied to the trailing electrode (T) to the current $I_L$ supplied to the leading electrode (L) ranges from 0.75 to 1.00. The flux used in the welding is a bonded flux containing 60 to 91 wt % in total of $SiO_2$, MgO and CaO, 5 to 30 wt % in total of $TiO_2$, $Al_2O_3$ and $CaF_2$, 2 to 8 wt % of metal powder, said flux containing a carbonate gas-forming component in an amount to generate 2 to 10 wt % of gases by thermal decomposition of said carbonate during welding, and the balance incidental impurities, the flux having a bulk specific gravity of 0.80 to 1.20 g/cm$^3$:

$$0.39 C_{WIRE} 0.39 C_{WEB} + 0.22 C_{FLANGE} \leq 0.135 \quad (1)$$

where
$C_{WIRE}$ is the C content of the wire (wt %),
$C_{WEB}$ is the C content of the web (wt %) and is $\leq 0.21$, and
$C_{FLANGE}$ is the C content of the flange (wt %) and is $\leq 0.21$.

6 Claims, 3 Drawing Sheets

HIGH-EFFICIENCY FILLET WELDING METHOD FOR STEEL PLATE

BACKGROUND OF THE INVENTION

1. Field of the Invention

The present invention relates to a high-efficiency fillet welding method for steel plate and, more particularly, to a high-efficiency fillet welding method for conducting arc welding of steel plates without requiring edge preparation.

2. Description of the Related Art

Architectural steel members are becoming thicker in accordance with the current tendency to build high rise buildings. For instance, steel plates used as the structural member of a so-called box post in such construction have thicknesses of about 100 mm, for example. Thicknesses of H-shapes are also increasing. As a consequence an unduly long time is required to build up and assemble such architectural steel members for high-rise buildings. This has given rise to a demand for improvement in the efficiency of the assembly procedure.

In general, fillet welding in fabricating a welded H-steel member, referred to as a "built-H" member, is conducted by partial penetration or full penetration welding. Full penetration welding is used when the web has a comparatively small thickness. For instance, Japanese Patent Publication No. 56-37029 discloses a method of preventing generation of pits and blowholes in welding primer coated steel plates which are 8 to 16 mm thick by employing small-diameter wires.

On the other hand, for welding thicker steel webs, the conventional method employs the steps of edge preparation, conducting welding on the obverse side, conducting gauging on the reverse side and effecting grinding and welding on the reverse side, thus attaining full penetration. Thus, the conventional method for making thick steel webs essentially requires expensive and time-consuming steps such as edge preparation, gauging and grinder finishing. For this reason it has been difficult to reduce the amount and cost of manual work and to improve arc time efficiency.

Attempts to attain partial or full penetration in fillet welding of steel plates, without conducting edge preparation and gauging, have encountered various problems which are still unsolved.

In general, melt-type fluxes are often used in fillet welding of thin H-shapes, because this type of flux has a low melting point and, hence, can suitably be used for high-speed welding. On the other hand, however, this type of flux tends to form narrow and convex beads as the welding speed is increased. In order to obviate this problem it has been proposed to cause the flux to foam to reduce the weight of the same thereby widening the weld beads. When this type of flux is used for welding thick steel members which require large welding heat input, the resulting amount of slag is unfavorably increased to an unacceptable level due to the low melting point of the flux, and as a result the appearance of the bead is impaired.

On the other hand, bonded fluxes, which are mix-bonded materials prepared from oxides, fluorides or carbonates, generally exhibit high melting temperatures and, therefore, are suitable for use for welding applications which require large heat input.

Welding without edge preparation also poses a problem in that the rate of dilution of the base metal is inevitably increased in order to attain the desired degree of penetration, so that hot cracking tends to occur particularly in steel plates having high carbon contents. Hot cracking tendency is closely related not only to the chemical composition of the weld metal but also to the cross-sectional shape of the bead. More specifically, hot cracking tends to occur when the penetration depth P is large for a given bead width W, i.e., when the ratio W/P between the bead width W and the penetration depth P is small. This means that the bead width should be increased as much as possible in order to prevent occurrence of hot cracking.

SUMMARY OF THE INVENTION

Accordingly, an object of the present invention is to provide a high-efficiency fillet welding method which enables, without requiring edge preparation, welding of steel plates having comparatively high carbon contents and thicknesses as large as 16 to 60 mm, thereby overcoming the above-described problems of the prior art.

The present invention provides a high-efficiency fillet welding method for conducting, by a tandem electrode method and without any edge preparation, T-shape fillet welding of steel plates. The steel plates have a carbon content C not more than 0.21 wt %, and welding is conducted by using a leading electrode (L) and a trailing electrode (T) composed of wires of about 4.8 to 6.4 mm diameter and containing C in an amount which meets the condition of formula (1) which follows. The welding wires also 1 contain about 1.50 to 2.50 wt % of Mn, such that the ratio $I_T/I_L$ of the current $I_T$ supplied to the trailing electrode (T) to the current $I_L$ supplied to the leading electrode (L) ranges from about 0.75 to 1.00, while employing a bonded flux containing about 60 to 91 wt % in total of $SiO_2$, MgO and CaO, about 5 to 30 wt % in total of $TiO_2$, $Al_2O_3$ and $CaF_2$, about 2 to 8 wt % of metal powder, about 2 to 10 wt % of gases generated by thermal decomposition of the carbonate during welding, and the balance incidental impurities, the flux having a bulk specific gravity of about 0.80 to 1.20 g/cm$^3$, wherein the above-identified equation is:

$$0.39 C_{WIRE} + 0.39 C_{WEB} + 0.22 C_{FLANGE} \leq 0.135 \quad (1)$$

where $C_{WIRE}$ is the C content of the wire (wt %), $C_{WEB}$ is the C content of the web (wt %) and is $\leq 0.21$, and $C_{FLANGE}$ is the C content of the flange (wt %) and is $\leq 0.21$.

The above and other objects, features and advantages of the present invention will become clear from the following description of the preferred embodiment when the same is read in conjunction with the accompanying drawings.

DESCRIPTION OF THE PREFERRED EMBODIMENTS

Figure 1:
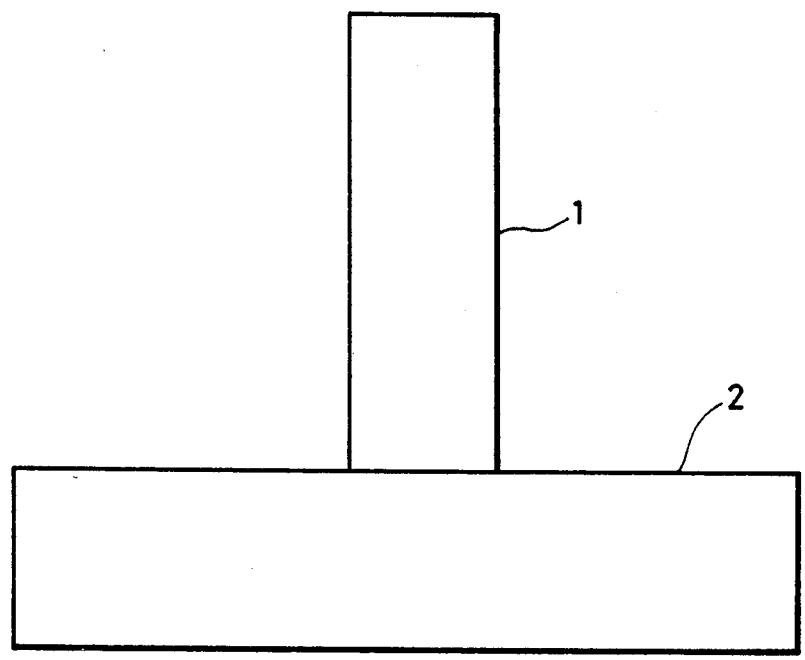
FIG. 1 is an illustration of a manner in which T-shape fillet welding is executed.

Features of the invention, as well as effects produced by these features, will be described in advance of description of embodiments.

We have made an intense study for a method enabling us to create an efficient submerged fillet welding on steel plates without requiring edge preparation, and have now accomplished this by tandem-electrode submerged arc welding using wires of a specific composition and diameter in combination with a bonded flux having a specific composition and a particular value of bulk specific gravity.

More specifically, we have found:

(1) It is effective to control the bulk specific gravity of the bonded flux and the diameters of the wires in widening the bead and preventing hot cracking of steel plates.

(2) For the purpose of preventing inclusion of slag, it is effective to employ wires of greater diameter than usual and to form a round-type penetration bottom with a large radius of curvature. Any sharp penetration bottom with small radius of curvature tends to enhance inclusion of slag and to promote the tendency toward hot cracking. Use of wires having large diameters is also effective in widening the weld bead.

(3) In tandem-electrode submerged arc welding, inclusion of slag is significantly influenced also by the ratio $I_T/I_L$ between the current $I_L$ supplied to the trailing electrode and the current $I_L$ supplied to the leading electrode. Inclusion of slag can be appreciably suppressed by maintaining this ratio constant.

We have made a study of these facts and have accomplished a fillet welding method which enables full or partial penetration fillet welding to be successfully carried out without requiring pre-processing such as edge preparation, gauging or grinding.

Features concerning the flux used in the method of the invention will now be described. The flux is important to provide good appearance of the weld bead. The flux contains $SiO_2$ which is the main slag-forming agent and which widens the bead while smoothing the bead surface. MgO also is a significant component since it elevates the melt point of the generated slag so as to improve the welding characteristics under large heat input, while reducing basicity of the flux so as to reduce the oxygen concentration in the weld metal thereby improving toughness.

CaO is an element which, like MgO, improves refractory characteristics of the generated slag and increases basicity of the flux. CaO is usually added in the form of $CaCO_3$ which generates CaO and $CO_2$ gases by thermal decomposition. These elements are important and a certain amount in total of these elements has to be included in the flux. In order to attain an appreciable improvement of bead appearance and refractory characteristic of the flux, the flux should contain at least about 60 wt % of these elements in total. Conversely, when the total content of these elements exceeds about 91 wt %, the melting point of the flux becomes too high and the bead width is reduced and harms the appearance of the weld. According to the invention, therefore, the flux essentially contains about 60 to 91 wt % in total of $SiO_2$, MgO and CaO.

$TiO_2$ is an element which improves detachability of slag and stabilizes the arc during welding. $Al_2O_3$ also is an important element necessary for adjusting slag viscosity. $CaF_2$ also plays an important role in controlling fluidity of the slag. When the total content of these elements is about 5 wt % or less, the bead appearance is impaired due to inferior slag detachability and excessive slag viscosity. Conversely, when the total content of these elements exceeds about 30 wt %, the slag viscosity is lowered to an unacceptably low level to render the arc unstable. For this reason, the total content of $TiO_2$, $Al_2O_3$, and $CaF_2$ in the flux should range from about 5 to 30 wt %.

The flux used in the present invention should contain, in addition to the above-described elements, about 2 to 8 wt % of metal powder serving as a deoxidation agent and also as an alloying element. Metal powder content of less than about 2 wt % makes it difficult to attain the desired toughness level of the weld metal and increases the tendency to generate pockmarks. Metal powder content exceeding about 8 wt % also causes a reduction of toughness because of a quenching effect attributable to too low oxygen concentration. The metal powder content, therefore, should be controlled to range from about 2 to 8 wt %. Typical examples of metal powders suitably employed in the method of the present invention are ferro-manganese, ferro-silicon and ferro-titanium.

A gas-forming radical contained in the form of carbonate is essential for the purpose of decreasing the hydrogen content in the weld metal. The carbonate is preferably $CaCO_3$ and generates CaO and $CO_2$ gas by thermal decomposition. The amount of the carbonate should be controlled for forming $CO_2$ to range from about 2 to 10 wt % in total weight of flux.

Because an amount of $CO_2$ below about 2 wt % does not provide any appreciable effect while an amount of $CO_2$ exceeding about 10 wt % causes deterioration of the bead configuration due to blowing by the gas.

We have confirmed that a flux having the above-described composition enables welding to be executed in a good manner. We also have found that grain size and bulk specific gravity of the flux are also significant factors in stabilizing the arc to form a wide bed with a high degree of stability. The grain size of the flux significantly affects the welding characteristics of the flux. More specifically, when the median diameter of the grains is below about 500 $\mu$m, the rate of melting of the flux is undesirably increased and, in addition, the fluidity of the flux is reduced, so that release of the gas from the arc cavity is hampered and renders the arc unstable. On the other hand, when the median grain diameter exceeds about 800 $\mu$m, the flux structure becomes so coarse as to hamper uniform melting of the flux, resulting in lack of stability of the arc. Therefore, the median diameter of grains which occupies 50% in the grain size distribution of the flux ranges between about 500 and 800 $\mu$m.

It is also necessary that the content of fine particles having grain sizes not greater than 295 $\mu$m, which are inevitably generated in the course of preparation of the flux, has to be maintained at about 15 wt % or less. Presence of such fine grains in an amount exceeding about 15 wt % undesirably increases the tendency to generate undercut.

A most critical problem encountered when welding is conducted without edge preparation is that the tendency toward hot cracking is enhanced particularly when the weld metal has a large C content, because of excessive rate of dilution of the base metal. Prevention of hot cracking, therefore, is one of the most important requirements in the method of the present invention. As stated before, control of the C content of the weld metal is necessary for preventing hot cracking and, in addition, the cross-sectional shape of the bead also is a factor for preventing hot cracking. A certain penetration depth is required in full-penetration welding. The tendency toward hot cracking is great when the bead width W is small for a given penetration depth P, i.e., when the ratio W/P is small. In order to prevent hot cracking, therefore, it is effective to increase the bed width W by reducing the bulk specific gravity of the flux. When the bulk specific gravity is about 0.8 g/cm$^3$ or smaller, however, the flux is too light in weight to maintain a stable arc cavity and the flux can easily be blown. On the other hand, a bulk specific gravity exceeding about 1.20 g/cm$^3$ enhances the force for pressing the arc cavity, tending to reduce the bead width. For these reasons, the bulk specific gravity of the flux is controlled to range from about 0.80 to 1.20 g/cm$^3$.

A description will now be given of the nature of the welding wire used in the method of the present invention.

It is easily understood that the C content in the weld metal has to be controlled at a reduced value because the C content is the most critical factor for minimizing hot cracking.

In fillet welding without edge preparation the rate of dilution of the base metal is so large that the C content in the weld metal is largely influenced by the C content of the base metal.

Namely, in order to obtain the desired penetration in fillet welding without edge preparation, it is necessary that the welding arc be aimed at a position which is slightly offset toward the web from the corner. Consequently, the rate of dilution of the base metal is greater in the web than in the flange. More specifically, the rates of dilution are 39% and 22% at the greatest in the web and in the flange, respectively.

With this knowledge, we have found that cracking is significantly suppressed when the C contents $C_{WIRE}$, $C_{WEB}$ and $C_{FLANGE}$ in the wire, web and the flange are controlled to meet the following condition $$0.39C_{WIRE} + 0.39C_{WEB} + 0.22C_{FLANGE} \leq 0.135 \quad (1)$$

where
$C_{WIRE}$ is the C content of the wire (wt %),
$C_{WEB}$ is the C content of the web (wt %) and is $\leq 0.21$, and
$C_{FLANGE}$ is the C content of the flange (wt %) and is $\leq 0.21$.

It is to be understood that carbon contents $C_{WEB}$ and $C_{FLANGE}$ of the web and the flange exceeding 0.21 wt % require that the carbon content $C_{WIRE}$ of the wire be reduced significantly. Such a large reduction in the C content of the wire is not recommended from a technical point of view, as well as from the viewpoint of cost. The carbon contents $C_{WEB}$ and $C_{FLANGE}$, therefore, should be not greater than about 0.21 wt %. The C content of the wire is therefore determined by the formula (1).

In order to obtain an appreciable deoxidation effect and strength, the Mn content of the wire should range from about 1.50 to 2.50 wt % regardless of the Mn content of the wire. The deoxidation effect is insufficient when the Mn content of the wire is below about 1.50 wt %, whereas an Mn content exceeding about 2.50 wt % causes the strength to be excessively increased allowing easy cracking at low temperatures due to increased rigidity. For these reasons, the Mn content in the wire is in the range from about 1.50 to 2.50 wt %.

Referring now to the wire diameter, wires of diameters below about 4.8 mm generally fail to provide sufficient bead width due to too small arc diameter. In addition, the use of such wires sharpens the shape of the penetration depth so as to cause undesirable effects such as inclusion of slag. It is therefore necessary that the wire used in the method of the present invention has a diameter not smaller than about 4.8 mm. On the other hand, when the wire diameter exceeds about 6.4 mm, the rigidity of the wire is increased to heavily load the welding machine. The wire diameter is therefore in the range from about 4.8 to 6.4 mm.

A description will now be given of the submerged arc welding procedure adopted in the method of the present invention. It is conducted by using a pair of electrodes, i.e. a leading electrode (L) and a trailing electrode (T), such that the ratio ($I_T/I_L$) between the current $I_T$ supplied to the trailing electrode T and the current $I_L$ supplied to the leading electrode L ranges from about 0.75 to 1.00. When the ratio ($I_T/I_L$) is below about 0.75 the slag which has been introduced by the leading electrode cannot be floated by the trailing electrode, thus allowing inclusion of the slag. On the other hand, when the above-mentioned ratio ($I_T/I_L$) is greater than about 1.00, inclusion of the slag by the trailing electrode (T) is enhanced because of the large current supplied to this electrode (T). The currents supplied to these electrodes, therefore, are controlled such that the ratio ($I_T/I_L$) ranges from about 0.75 to 1.00.

Full-penetration welding is applicable when the steel web thickness ranges from about 16 mm to 36 mm. Namely, full-penetration welding conducted on steel webs exceeding about 36 mm in thickness enhances the tendency to undergo hot cracking due to too narrow bead attributable to too much depth of penetration and due to increased rate of dilution of the base metal.

It is therefore possible to effect welding without edge preparation by use of the full-penetration method of this invention when the steel web thickness is from about 16 mm to 36 mm and by the partial penetration method (penetration of bead on each side being at least about ⅓ the web thickness) when the steel web thickness is from about 36 mm to 60 mm. Edge preparation is essentially required when the steel web thickness exceeds about 60 mm. The method of the present invention, therefore, can be applied to the welding of steel webs having thicknesses 60 mm or smaller.

EXAMPLES

Examples of the invention will be described hereinunder.

Example 1

Bonded fluxes having chemical compositions and powder characteristics shown in Table 1 were prepared. A web and a flange of steels specified by JIS SM-50A and having compositions shown in Table 2, 22 mm and 36 mm in thickness, respectively, were assembled in a T-like form as shown in FIG. 1, and fillet welding was conducted on this T-form structure using the above-mentioned fluxes. Chemical compositions of wires used in the fillet welding and the welding conditions are shown in Tables 3 and 4, respectively.

Factors such as stability of the arc during welding, bead appearance, cross-sectional shape of the bead, relationship between the oxygen concentration of the weld metal and toughness of the weld metal, and so forth were examined to obtain the results shown in Table 5.

TABLE 1

CHEMICAL COMPOSITION AND POWDER CHARACTERISTICS OF TESTED FLUX

| SYMBOL | CHEMICAL COMPOSITIONS (WT %) | | | | | MEDIAN DIAMETER OF GRAINS ($\mu$m) | GRAINS SMALLER THAN 295 $\mu$m (WT %) | BULK SPECIFIC GRAVITY (g/m$^3$) |
|---|---|---|---|---|---|---|---|---|
| | $SiO_2$ + MgO + CaO | $TiO_2$ + $Al_2O_3$ + $CaF_2$ | METAL POWDER | GAS | OTHERS | | | |
| FLUX OF INVENTION | | | | | | | | |
| A-1 | 68.5 | 17.6 | 6.6 | 3.9 | 3.4 | 580 | 5.4 | 1.01 |
| A-2 | 74.1 | 13.3 | 3.2 | 4.2 | 5.2 | 750 | 11.0 | 0.99 |
| A-3 | 86.2 | 6.8 | 2.1 | 3.1 | 1.8 | 690 | 4.7 | 0.90 |
| A-4 | 81.4 | 7.0 | 4.1 | 7.1 | 0.4 | 800 | 6.8 | 1.11 |
| A-5 | 63.8 | 24.8 | 7.9 | 2.5 | 1.0 | 610 | 9.0 | 0.85 |
| COMPARISON FLUX | | | | | | | | |
| B-1 | 81.1 | _4.3_ | 6.3 | _1.6_ | 6.7 | 800 | 6.9 | 1.07 |
| B-2 | _58.1_ | _34.5_ | 2.4 | 3.1 | 1.9 | _490_ | 13.8 | _1.29_ |
| B-3 | 70.4 | 13.8 | 6.3 | 6.5 | 3.0 | 570 | _16.8_ | _1.28_ |
| B-4 | 78.3 | 14.9 | _1.1_ | 3.6 | 2.1 | 630 | 10.4 | _0.78_ |
| B-5 | 80.4 | 5.4 | 2.2 | _11.3_ | 0.7 | _880_ | 10.8 | 0.98 |
| B-6 | _95.8_ | 1.0 | _0.0_ | 2.0 | 1.2 | 700 | 6.7 | 0.88 |
| B-7 | 68.4 | 15.6 | _8.8_ | 6.1 | 1.1 | 750 | 8.6 | _1.30_ |

NOTE: Underlined values fail to fall within ranges specified by the invention.

TABLE 2

CHEMICAL COMPOSITION AND THICKNESSES OF TESTED STEEL SHEETS

| POSITIONS | THICKNESSES (mm) | SPECIFICATIONS | CHEMICAL COMPOSITIONS (WT %) | | | | |
|---|---|---|---|---|---|---|---|
| | | | C | Si | Mn | P | S |
| WEB | 22 | SM50A | 0.16 | 0.20 | 1.34 | 0.011 | 0.009 |
| FLANGE | 36 | SM50A | 0.16 | 0.22 | 1.38 | 0.010 | 0.007 |

TABLE 3

CHEMICAL COMPOSITIONS OF WIRES (WT %)

| | C | Si | Mn | P | S |
|---|---|---|---|---|---|
| SAW WIRE | 0.05 | 0.25 | 1.95 | 0.010 | 0.005 |

TABLE 4

WELDING CONDITIONS

| | WIRE DIAMETERS (mm$\phi$) | CURRENT (A) | VOLT (V) | SPEED (cm/min) | CURRENT RATIO ($I_T/I_L$) |
|---|---|---|---|---|---|
| LEADING ELECTRODE (L) | 4.8 | 1200 | 34 | 40 | 0.79 |
| TRAILING ELECTRODE (T) | 6.4 | 950 | 42 | | |

TABLE 5

WELDING EFFICIENCY, OXYGEN CONCENTRATION IN WELD METAL AND ENERGY ABSORPTION

| SYMBOL | ARC STABILITY * | BEAD APPEARANCE | BEAD SECTION APPEARANCE ** | $O_2$ CONCENTRATION IN WELD METAL (ppm) | ENERGY ABSORPTION AT 0° C. (kgf · m) | REMARKS |
|---|---|---|---|---|---|---|
| FLUX OF INVENTION | | | | | | |
| A-1 | STABLE | GOOD | GOOD | 350 | 9.6 | |
| A-2 | STABLE | GOOD | GOOD | 380 | 8.8 | |
| A-3 | STABLE | GOOD | GOOD | 400 | 7.8 | |
| A-4 | STABLE | GOOD | GOOD | 340 | 11.0 | |
| A-5 | STABLE | GOOD | GOOD | 410 | 9.0 | |
| COMPARI- | | | | | | |

TABLE 5-continued
WELDING EFFICIENCY, OXYGEN CONCENTRATION IN WELD METAL AND ENERGY ABSORPTION

| SYMBOL | ARC STABILITY * | BEAD APPEARANCE | BEAD SECTION APPEARANCE ** | $O_2$ CONCENTRATION IN WELD METAL (ppm) | ENERGY ABSORPTION AT 0° C. (kgf · m) | REMARKS |
| --- | --- | --- | --- | --- | --- | --- |
| SON FLUX | | | | | | |
| B-1 | STABLE | NOT GOOD (INFERIOR SLAG DETACHABILITY) | NOT GOOD (FINE CRACKING) | 400 | 9.0 | MICRO CRACKING DUE TO HYDROGEN |
| B-2 | UNSTABLE | NOT GOOD (BEAD SURFACE ROUGH) | NOT GOOD (SLAG INCLUSION) | 480 | 7.0 | |
| B-3 | UNSTABLE | NOT GOOD (PROJECTED AND THIN) | NOT GOOD (SLAG INCLUSION) | 420 | 7.0 | |
| B-4 | UNSTABLE | NOT GOOD (POCK MARK, BEAD SURFACE ROUGH) | GOOD | 580 | 3.0 | |
| B-5 | UNSTABLE | NOT GOOD (BEAD SURFACE ROUGH) | GOOD | 400 | 8.8 | |
| B-6 | STABLE | NOT GOOD (POCK MARK, THIN) | GOOD | 600 | 2.7 | |
| B-7 | STABLE | NOT GOOD (THIN) | NOT GOOD (CRACKING) | 200 | 2.7 | HOT CRACKING |

NOTE:
ARCS WITH BLOW-UP ARE DETERMINED AS "UNSTABLE".
BEADS WITH LARGE WIDTHS AND ROUND PENETRATION BOTTOM ARE DETERMINED AS "GOOD".

As will be clearly understood from Table 5, the fluxes prepared in accordance with the present invention provide superior fillet welding characteristics, as well as excellent toughness of the weld metals. In contrast, comparative fluxes B-1 to B-7, which did not fall within the invention, provided unsatisfactory welding characteristics and toughness of the weld metal.

More specifically, the comparative flux B-1, in which the total content of $TiO_2$, $Al_2O_3$ and $CaF_2$ was as small as 4.3 wt %, exhibited inferior detachability of slag as well as too small rate of generation of gas, with the result that micro cracking was caused in the weld metal due to the presence of diffused hydrogen.

In the comparative flux B-2, the total content of $SiO_2$, MgO and CaO was outside the range encompassed by this invention. This comparative flux showed significant roughness of the bead surface due to inferior refractory characteristics. Furthermore, the bead width was narrow due to presence of a large content of fine grains of the flux and due to a large bulk specific gravity of 1.29 g/cm³, with the result that the penetration bottom was sharpened to allow inclusion of the slag.

The comparative flux B-3 had such a grain size distribution that fine grains smaller than 295 μm occupied 16.8 wt % of the total flux grains. As a consequence the arc was rendered unstable due to insufficient gas relief. Inclusion of slag also was observed due to the large bulk specific gravity of 1.28 g/cm³ as in the case of the comparative flux B-2.

The comparative flux B-4 had insufficient content of ferro-manganese as the alloy-forming deoxidizing agent. As a consequence this comparative flux showed pockmarks on the bead surface. This flux also showed a low toughness level due to a high oxygen concentration in the weld metal. Furthermore, the arc was unstable because of insufficient force holding the arc cavity attributable to a small bulk specific gravity.

The comparative flux B-5 exhibited excessive blowing during welding and a consequent lack of stability of the arc, due to too high a rate of generation of the gas. In addition, melting of this flux could not be achieved uniformly due to presence of coarse grains.

The comparative flux B-6 had a chemical composition which does not fall within the present invention. A strong tendency toward fine cracking in the bead was observed due to an excessively high melting point and too small a viscosity. Furthermore, generation of pockmarks and reduction in toughness caused by increase in the oxygen concentration in the weld metal were observed due to the absence of ferro-manganese powder which serves as an alloying and deoxidizing element.

The comparative flux B-7 showed a reduction of toughness of the weld metal due to quenching which was produced by excessive deoxidation attributable to an excessive content of metal powder as the alloying and deoxidation element. In addition, hot cracking was observed due to insufficient bead width and excessive penetration depth attributable to excessive bulk specific gravity.

EXAMPLE 2

Using the fluxes of the invention used in Example 1, as well as the comparative fluxes A-2 and B-1, tests were conducted for the purpose of investigating effects produced on the welding characteristics by the compositions of the base metal and the wires and by the welding conditions.

Tables 6 and 7 show chemical compositions of the steel plates and the wires, respectively, while welding conditions are shown in Table 8.

Full-penetration T-form fillet welding was conducted by using various combinations of these flux and steel compositions and welding conditions and the results of the welding tests were evaluated and provided the results shown in Table 9.

TABLE 6

TESTED STEELS AND CHEMICAL COMPOSITIONS

| SYMBOLS | POSITIONS | SHEET THICKNESSES (mm) | CHEMICAL COMPOSITIONS (WT %) | | | | |
|---|---|---|---|---|---|---|---|
| | | | C | Si | Mn | P | S |
| C-1 | WEB | 22 | 0.16 | 0.20 | 1.34 | 0.011 | 0.009 |
| | FLANGE | 36 | 0.16 | 0.22 | 1.38 | 0.010 | 0.007 |
| C-2 | WEB | 22 | 0.19 | 0.21 | 1.20 | 0.010 | 0.009 |
| | FLANGE | 36 | -0.18 | 0.22 | 1.22 | 0.011 | 0.007 |
| C-3 | WEB | 22 | 0.22 | 0.20 | 1.19 | 0.010 | 0.008 |
| | FLANGE | 36 | 0.22 | 0.20 | 1.19 | 0.010 | 0.008 |

TABLE 7

CHEMICAL COMPOSITIONS OF TESTED WIRES (WT %)

| SYMBOLS | C | Si | Mn | P | S |
|---|---|---|---|---|---|
| D-1 | 0.05 | 0.25 | 1.95 | 0.010 | 0.005 |
| D-2 | 0.05 | 0.23 | 1.30 | 0.010 | 0.004 |
| D-3 | 0.10 | 0.22 | 1.90 | 0.010 | 0.005 |

TABLE 8

WELDING CONDITIONS

| SYMBOLS | ELECTRODES | WIRE DIAMETER (mm) | CURRENT (A) | VOLT (V) | SPEED (cm/min) | CURRENT RATIO ($I_T/I_L$) |
|---|---|---|---|---|---|---|
| E-1 | L | 4.8 | 1200 | 34 | 40 | 0.79 |
| | T | 6.4 | 950 | 42 | | |
| E-2 | L | 4.8 | 1200 | 34 | 38 | 0.71 |
| | T | 6.4 | 850 | 42 | | |
| E-3 | L | 4.0 | 1200 | 34 | 40 | 0.79 |
| | T | 4.8 | 950 | 42 | | |
| E-4 | L | 4.8 | 1200 | 34 | 47 | 1.08 |
| | T | 6.4 | 1300 | 42 | | |

TABLE 9

| | SYMBOLS | FLUXES | STEEL SHEETS | TABLE WIRES | WELDING CONDITIONS | RESULTS |
|---|---|---|---|---|---|---|
| EMBODIMENT OF INVENTION | F1 | A-2 | C-1 | D-1 | E-1 | GOOD |
| COMPARATIVE EXAMPLE | G1 | A-2 | C-1 | D-1 | E-2 | INCLUSION OF SLAG |
| | G2 | A-2 | C-1 | D-1 | E-3 | INCLUSION OF SLAG DUE TO SMALL BEAD WIDTH AND LARGE PENETRATION |
| | G3 | A-2 | C-1 | D-2 | E-1 | INSUFFICIENT STRENGTH DUE TO SMALL Mn CONTENT (LOCAL BLOW HOLE) |
| | G4 | A-2 | C-1 | D-3 | E-1 | HOT CRACKING |
| | G5 | A-2 | C-2 | D-1 | E-1 | HOT CRACKING |
| | G6 | A-2 | C-3 | D-1 | E-1 | HOT CRACKING |
| | G7 | B-1 | C-1 | D-1 | E-1 | INFERIOR SLAG DETACHABILITY, HYDROGEN MICROCRACKING |
| | G8 | A-2 | C-1 | D-1 | E-4 | INCLUSION OF SLAG |

As will be seen from Table 9, the combinations of the steel and wire compositions and welding conditions meeting the requirements of the present invention provided good full-penetration fillet welding without any defect. In contrast, the comparative examples which did not meet the requirements of the present invention exhibited drawbacks.

More specifically, the comparative example G1 showed a heavy inclusion of slag because the welding conditions were outside the scope of the invention in that the current ratio was as small as 0.71. The comparative example G2, employing wires of too small diameter, could not provide sufficiently large bead width, with the result that the penetration bottom was sharpened to allow inclusion of slag, causing strong tendency toward cracking.

In comparative example G3, blowholes were locally observed and the strength was reduced due to the fact that the Mn content in the wire was too small.

Comparative examples G4 to G6 showed hot cracking due to excessive C content in the base metals or wires.

In comparative example G7 the welding was conducted by using the comparative flux B-1 in place of the flux A-2 of the invention, while the welding conditions were optimized in accordance with the invention. In this case, however, inferior bead appearance and internal defects were observed as explained before in connection with Table 5.

In comparative example G8, the ratio of the current $I_L$ supplied to the leading electrode (L) to the current $I_T$ supplied to the trailing electrode (T) was as large as 1.08. As a consequence, inclusion of slag was caused due to a gauging effect produced by the trailing electrode (T) itself.

Thus, satisfactory welding results were obtained only when the welding was conducted using the combination of the flux and wires and welding conditions meeting the requirements of the present invention.

Figure 2:
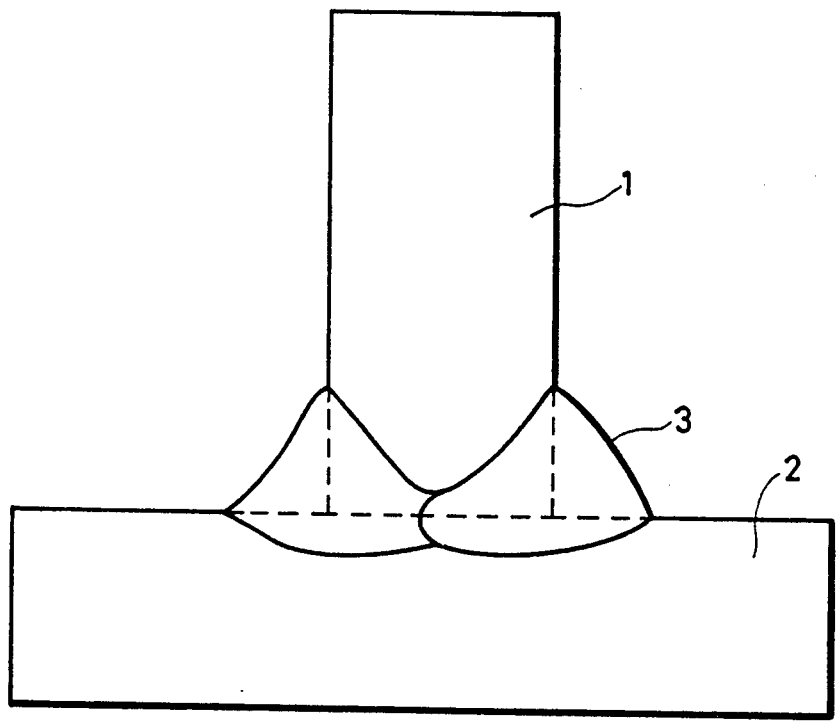
FIG. 2 is an illustration of a full-penetration T-shape fillet weld.

Although the method of the invention was applied to full penetration welding of steel webs thicker than 36 mm, the result was unsuccessful in that hot cracking was promoted due to too narrow width and too large penetration as shown in FIG. 2 and due to too large dilution of the base metal.

Figure 3:
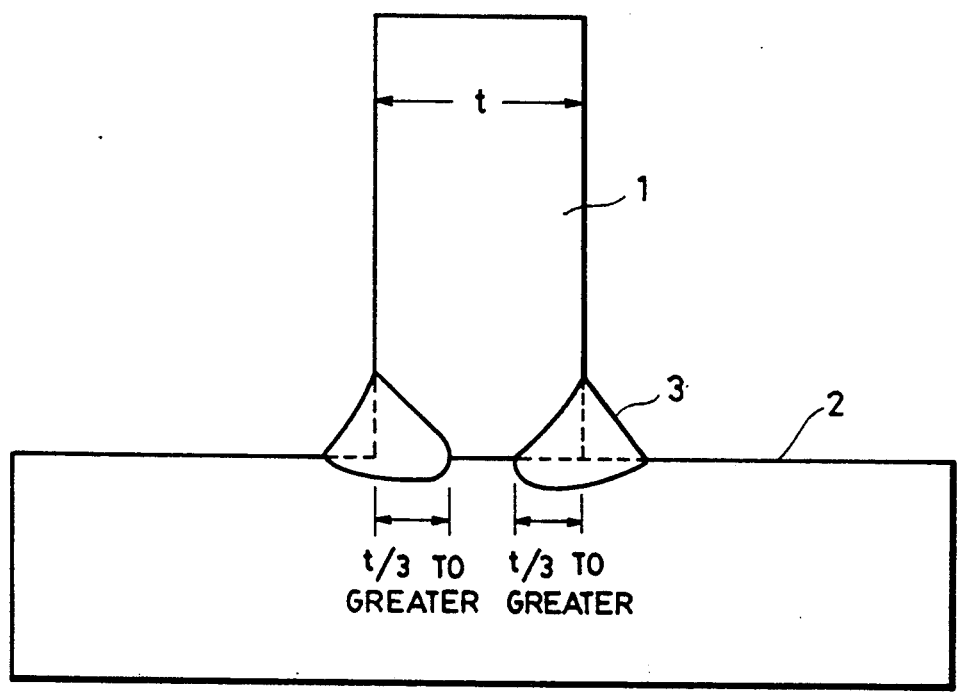
FIG. 3 is an illustration of a partial-penetration T-shape fillet weld.

T-form fillet welding was conducted on steel webs 40 mm thick having the same composition as C-1 shown in Table 6, using the wire D-1 shown in Table 1, while varying the welding conditions. Cracking was observed in all these cases when the welding was conducted by the full-penetration method. Welding was also conducted on steel webs having thicknesses up to 36 mm, employing the wire D-1 under the same conditions as above. No cracking was observed in this case. Tests were also conducted by partial penetration welding in which, as shown in FIG. 3, the penetration depth at each side was at least ⅓ the thickness of the web. In this case welding was conducted successfully even when the web thickness exceeded 36 mm, up to 60 mm. It was thus confirmed that the method of the present invention can be carried out successfully by the full or partial penetration methods when the steel web thickness is not greater than about 36 mm and by the partial penetration method when the steel web thickness exceeds about 36 mm up to 60 mm, without requiring edge preparation or other preparatory processing.

As will be understood from the foregoing description, the present invention makes it possible to carry out T-form fillet welding of thick steel webs having thicknesses of about 16 to 60 mm, by using specific combinations of flux and wires under specific conditions, without requiring edge preparation.

Thus, the method in accordance with the present invention eliminates the necessity for preparatory work including edge preparation, gauging on the reverse side, grinding and so forth, thus offering important industrial advantages such as reduction in production cost and shortening of delivery time.

Although the invention has been described in specific terms, it is to be understood that the described embodiment and examples are only illustrative and various changes and modifications may be imparted thereto without departing from the scope of the invention which is limited solely by the appended claims.

What is claimed is:

1. In a high-efficiency fillet welding method for conducting, by a tandem electrode method without edge preparation, T-shape fillet welding of thick steel webs having a carbon content not more than 0.21 wt %, the steps which comprise:

conducting the welding in an area with a current $I_L$ supplied to a leading electrode (L) and a current $I_T$ supplied to a trailing electrode (T), said electrodes being composed of wires of about 4.8 to 6.4 mm diameter, said wires having contents of about 1.50 to 2.50 wt % of Mn, maintaining the ratio $I_T/I_L$ of the current $I_T$ supplied to the trailing electrode (T) to the current $I_L$ supplied to the leading electrode (L) in a range from about 0.75 to 1.00, introducing into said welding area a bonded flux containing about 60 to 91 wt % in total of $SiO_2$, MgO and CaO, about 5 to 30 wt % in total of $TiO_2$, $Al_2O_3$ and $CaF_2$ and about 2 to 8 wt % of metal powder, said bonded flux containing a carbonate component in an amount to generate gases, about 2 to 10 wt % of gases by thermal decomposition during welding, and the balance incidental impurities, said flux having a bulk specific gravity of 0.80 to 1.20 g/cm$^3$, and said electrodes containing carbon in an amount set forth in the equation $$0.39C_{WIRE}+0.39C_{WEB}+0.22C_{FLANGE} \leq 0.135 \quad (1)$$

where
$C_{WIRE}$ is the C content of the wire (wt %),
$C_{WEB}$ is the C content of the web (wt %) and is $\leq 0.21$, and
$C_{FLANGE}$ is the C content of the flange (wt %) and is $\leq 0.21$.

2. A high-efficiency fillet welding method according to claim 1, wherein said web has a thickness ranging from about 16 mm to 60 mm.

3. A high-efficiency fillet welding method according to claim 1, wherein the fillet welding is conducted by submerged arc welding.

4. A high-efficiency fillet welding method according to claim 1, wherein said metal powder is selected from the group consisting of ferro-manganese, ferro-silicon and ferro-titanium.

5. A high-efficiency fillet welding method according to claim 1, wherein said carbonate is $CaCO_3$.

6. A high-efficiency fillet welding method according to claim 1, wherein said flux has such a grain size distribution that the median diameter of grains occupying 50% of the total flux ranges from about 500 to 800 μm and that any fine grains present having grain sizes not greater than 295 μm occupy about 15 wt% or less of the total flux.

* * * * *

UNITED STATES PATENT AND TRADEMARK OFFICE
CERTIFICATE OF CORRECTION

PATENT NO. : 5,171,958
DATED : December 15, 1992
INVENTOR(S) : Tadamasa Yamaguchi et al It is certified that error appears in the above-identified patent and that said Letters Patent is hereby corrected as shown below:

In Column 3, line 30 please change "$I_L$" to --$I_T$--.

Signed and Sealed this

Nineteenth Day of October, 1993

Attest:

BRUCE LEHMAN

Attesting Officer     Commissioner of Patents and Trademarks